US006243625B1

United States Patent
Wyatt et al.

(10) Patent No.: US 6,243,625 B1
(45) Date of Patent: Jun. 5, 2001

(54) AUTOMATED QUARRY OPERATION WITH COMMUNICATION INTERFACE

(75) Inventors: Peter F. Wyatt; Bradford P. Wyatt, both of West Boylston; Matthew C. Peterson, Sudbury, all of MA (US)

(73) Assignee: N E D Corp., Worcester, MA (US)

( * ) Notice: Subject to any disclaimer, the term of this patent is extended or adjusted under 35 U.S.C. 154(b) by 0 days.

(21) Appl. No.: 09/238,772

(22) Filed: Jan. 28, 1999

Related U.S. Application Data

(60) Provisional application No. 60/044,455, filed on Apr. 12, 1996.

(51) Int. Cl.[7] .................................................. G05B 19/418
(52) U.S. Cl. ......................... 700/284; 700/159; 700/160; 700/281; 700/301; 408/11; 408/56; 229/1.2; 229/1.7
(58) Field of Search .............................. 700/245, 86, 301, 700/159, 160, 192, 284, 281; 175/24, 40; 173/28, 42, 46, 8, 9, 11; 408/11, 17, 56, 61, 97; 229/1.2, 1.7

(56) References Cited

U.S. PATENT DOCUMENTS

| | | | |
|---|---|---|---|
| 4,176,883 | * | 12/1979 | Liesveld .................................. 299/17 |
| 4,246,973 | * | 1/1981 | Mayer ...................................... 173/8 |
| 4,809,788 | * | 3/1989 | Nelson .................................... 173/28 |
| 4,872,293 | * | 10/1989 | Yasukawa et al. ..................... 451/75 |
| 5,257,743 | * | 11/1993 | Brown, Jr. ......................... 241/257.1 |
| 5,411,432 | * | 5/1995 | Wyatt et al. ............................ 451/92 |
| 5,547,569 | * | 8/1996 | Spencer ................................ 210/206 |

OTHER PUBLICATIONS

Huneiti et al., Excitation Of Electrohydrodynamic Surfaces Waves On A Conducting Liquid Jet Employing AC Field, IEEE., pp. 1768–1774, 1996.*
Turnbull, On The Instability Of An Electrostatically Sprayed Liquid Jet, IEEE., pp. 183–788, 1990.*
Sato et al., Production of Oil/Water Type Uniformly Sized Droplets Using a Convergent AC Electric Field, IEEE., pp. 138–145, 1996.*

* cited by examiner

Primary Examiner—William A. Cuchlinski, Jr.
Assistant Examiner—McDieun Marc
(74) Attorney, Agent, or Firm—Ourpal Asija

(57) ABSTRACT

In an automated quarry operation an unmanned high pressure computer controlled liquid jet cutting system particularly adopted for cutting granite on-site with device for automatically and safely shutting off the operation upon encountering unforeseen, unusual or abnormal technical problems and circumstances such as unworkable hard spots, unusual water pressure etc. The system also includes automatic communication of the status of the system. The system includes a power unit, a balanced oscillator, a communication interface, a plurality of sensors and transducers, an optional mobile system, multiple intensifiers, one or more nozzles with diamond or sapphire orifice and a microcontroller with a control panel for programming and controlling rise and fall, indexer and oscillator system.

3 Claims, 12 Drawing Sheets

AUTOMATED QUARRY OPERATION WITH COMMUNICATION INTERFACE

RELATED DOCUMENT

This application is related to and based upon provisional disclosure Number 60/044,455 filed on Apr. 12, 1996 under the same title, "Automated Quarry Operation with Communication Interface" and by the same inventors.

BACKGROUND

This invention relates to method devices and system for automated quarry operation. More particularly it relates to automatically shutting of an unmanned liquid jet cutting system upon encountering unforseen, unusual or abnormal technical problems and circumstances.

SUMMARY

An automated quarry robotic system comprising a power unit, a balanced oscillator, a communication interface, a plurality of sensors and transducers, an optional mobile system, multiple intensifiers, one or more nozzles with diamond or sapphire orifice and a PLC (programmable logic controller which is a micro-controller with a control panel for programming and controlling rise and fall, indexer and oscillator system.

The system also includes means for automatically communicating via phone or wireless the status of the system to the responsible party so that the problem can be solved and the system restarted at the earliest opportunity. The system also includes means for automatically and safely shutting off the operation upon encountering unforseen, unusual or abnormal technical problems and circumstances such as unworkable hard spots, unusual water pressure etc.

PRIOR ART

Notwithstanding the inventors are intimately familiar with the prior art in their industry, a prior art search was nonetheless conducted and the following pertinent U.S. prior art patents were uncovered arranged in reverse chronological order.

a) U.S. Pat. No. 5,568,030 awarded to Nishikawa et al on Oct. 22, 1996 for, "Travel Control Method, Travel Control Device and Mobile Robot for Mobile Robot Systems"
  b) U.S. Pat. No. 5,436,903 bestowed upon Young et al on Jul. 15, 1995 for "Method and Apparatus for Use in a Network of the Ethernet Type to Improve Fairness by Controlling Collision Backoff Times and Using Stopped Backoff Timing in the Event of Channel Capture"
  c) U.S. Pat. No. 5,411,432 honorably conferred upon Wyatt et al on May 2, 1995 for "Programmable Oscillating Liquid Jet Cutting System"
  d) U.S. Pat. No. 5,257,743 issued to Charles K Brown Jr. on Nov. 2, 1993 for "Quarry Pulverizer"
  e) U.S. Pat. No. 5,124,620 honorably given to Kurebayashi et al on Jun. 23, 1992 for, "Control Method for Robots"
  f) U.S. Pat. No. 4,872,293 issued to Yasukawa et al on Oct. 10, 1989 for "Abrasive Water Jet Cutting System"
  g) U.S. Pat. No. 4,637,017 earned by Assaal et al on Jan. 13, 1987 for "Monitoring of Input Backoff in Time Division Multiple Access Communication Satellites."
  h) U.S. Pat. No. 4,176,883 issued to Daniel Liesveld on Dec. 4, 1979 for "Oscillating Liquid Jet System and Method for Cutting Granite and the Like"
  i) U.S. Pat. No. 4,135,762 earned by Vito Biancale on Jan. 23, 1979 for "Quarry Operation"

Prior art fluid jet cutting systems are not suitable for unmanned operation without serious risk and concomitant liability. Prior art system also do not include a fail safe or even fail soft way of shutting the system automatically when problems are encountered. Lastly prior art quarry systems lack communication interface to inform a remotely located human being the status of the system.

In summary the prior art systems do not meet singly or even in combination the following objectives for this system.

OBJECTIVES

1) It is an objective of this invention to provide an automated quarry operation.

2). Another objective of this invention is to provide a fail soft and even fail safe way of shutting the system automatically when problems are encountered.

3) Another objective of this invention is to provide a communication interface for automatically communicating the status of the system to a remote supervisor.

4) Another objective of this invention is to provide a programmable interface such that the system can be reprogrammed for varied applications readily.

5) Another objective of this invention is to provide a hard spot interface to limit the effect of a small hard area of a given material on the average cutting rate of the material.

6) Another objective of this invention is to increase the efficiency of cut by working around a hard spot according to a preprogrammed algorithm.

7) Another objective of this invention is to provide multiple water jet cutting nozzles driven and powered by the same power unit on the same crawler to increase the cut rate efficiency and cost effectiveness on-site at a quarry.

8) Another objective of this invention is to provide an environmentally friendly system.

9) Another objective of this invention is to provide safer, quicker method of cutting stone on site at a quarry.

10) Another objective of this invention is to provide a system that is reliable and easy to maintain.

11) Another objective of this invention is to provide a system that is intuitive and easy to use such that it requires little training or retraining.

12) Another objective of this invention is that the thickness of the cut, the pitch, the rise and fall speed and the jet cut path be all coordinated and computer controlled such that the operator needs to enter or reset only the minimum set of parameters for each new programmable automatic unattended cut.

13) Another objective of this invention is that it provide all of the above mentioned objectives concurrently in high horse power ($Q*P*N$), wherein Q=Flow; P=Pressure and N=A constant factor.

14) Another objective of this invention is to provide a means for adjusting the balance of the balanced oscillator incorporated in this invention.

15) Another objective of this invention is to pretension the oscillator or high pressure tubing so as to alter the position and/or dwell of the nozzle as it moves to and fro.

16) Another objective of this invention is to automatically maximize the productivity of the cut under various pressures and positions of the stone being aut.

17) Another objective of this invention is to provide a means for automatically and readily fine tuning the shape of the cut under differing quarry conditions.

18) Another objective is to reduce the liability of the owners and operators of the quarry.

19) Another objective is to reduce accidents, noise, dust from blasting.

20) Other objectives of this invention reside in its simplicity, design elegance, ease of manufacture, ease of training and the like as will become apparent from the following brief description of the drawing and detailed description of the preferred and various alternate embodiments.

BRIEF DESCRIPTION OF THE DRAWINGS

The objects, features, and advantages of the present invention and its application will be more readily appreciated when read in conjunction with the accompanying drawing, in which:

d) FIG. 2 is a flow chart of the overall operation of the unmanned quarry operation of this invention.

Figure 6:
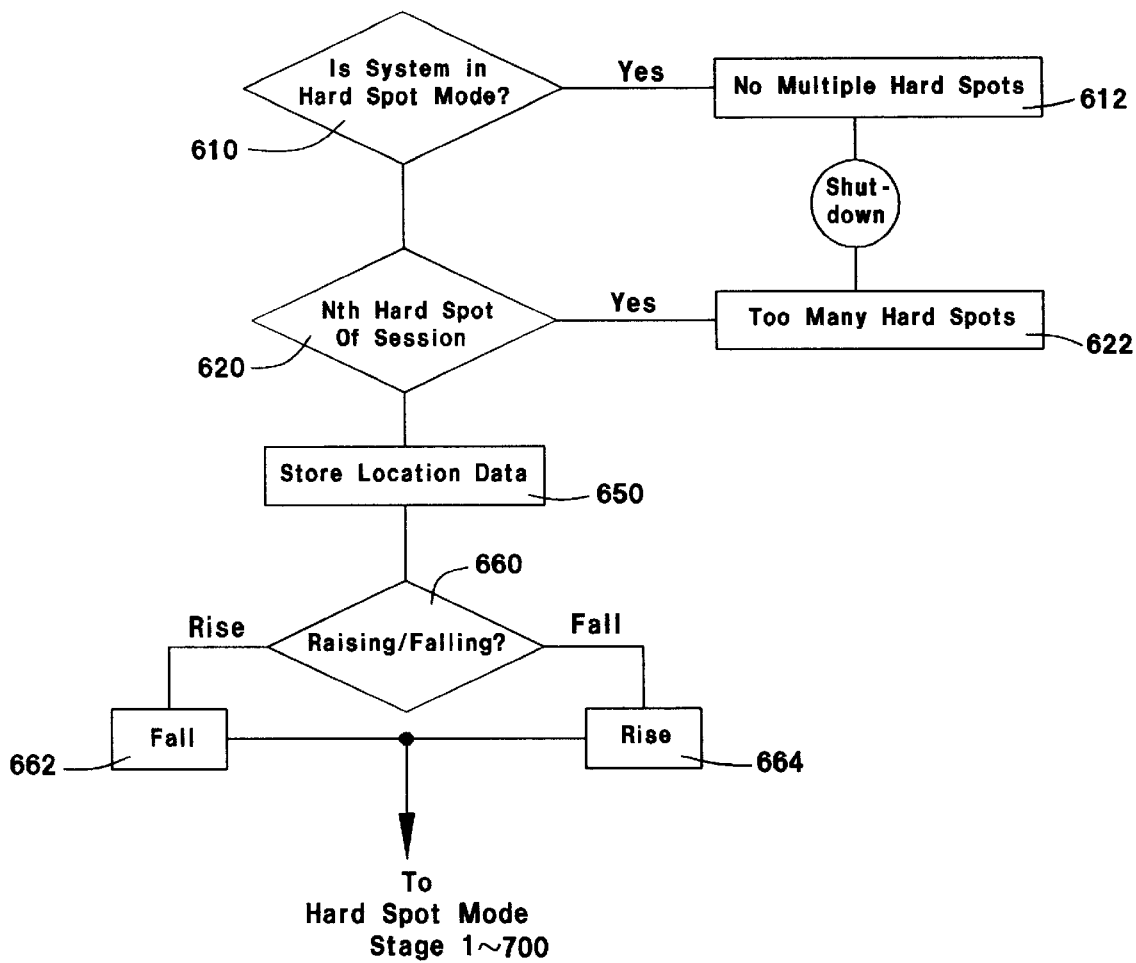
Figure 7:
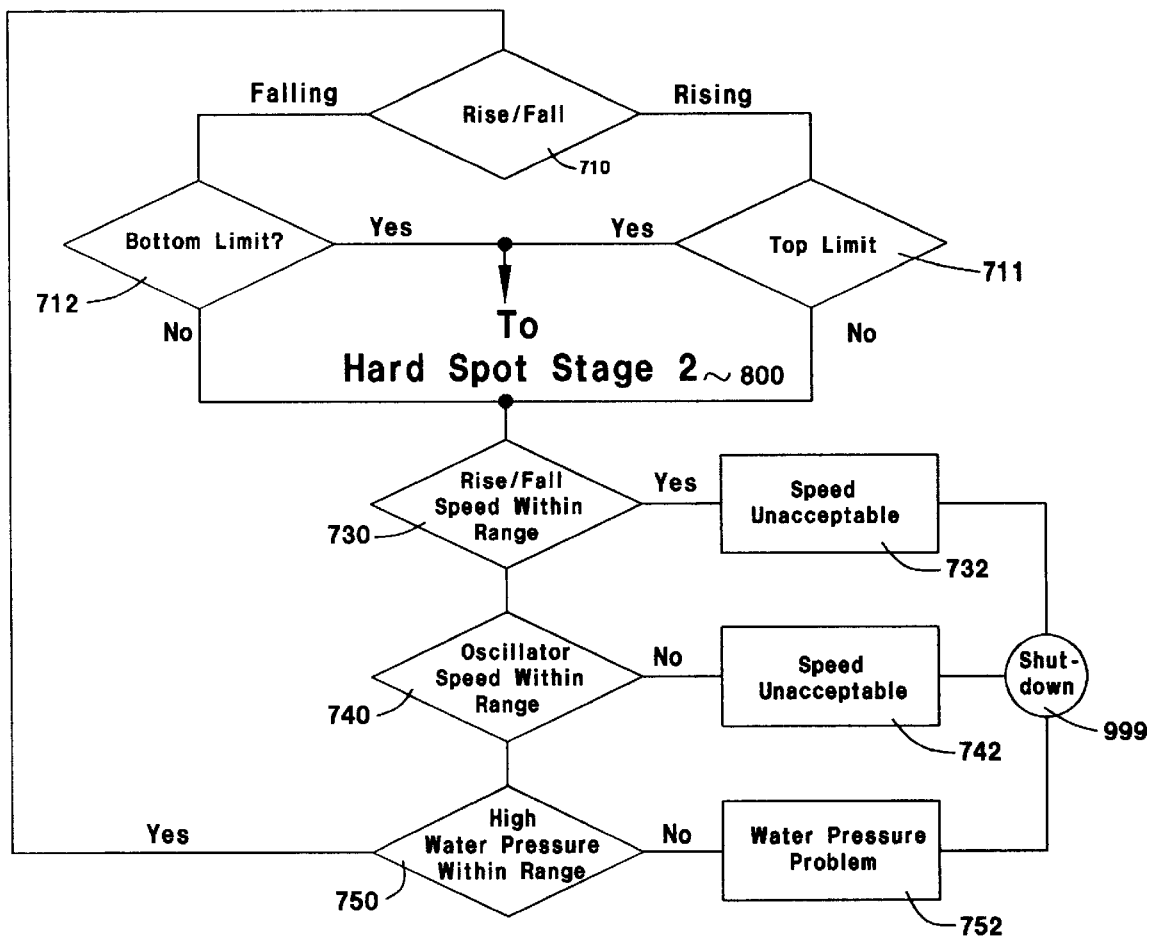
Figure 8:
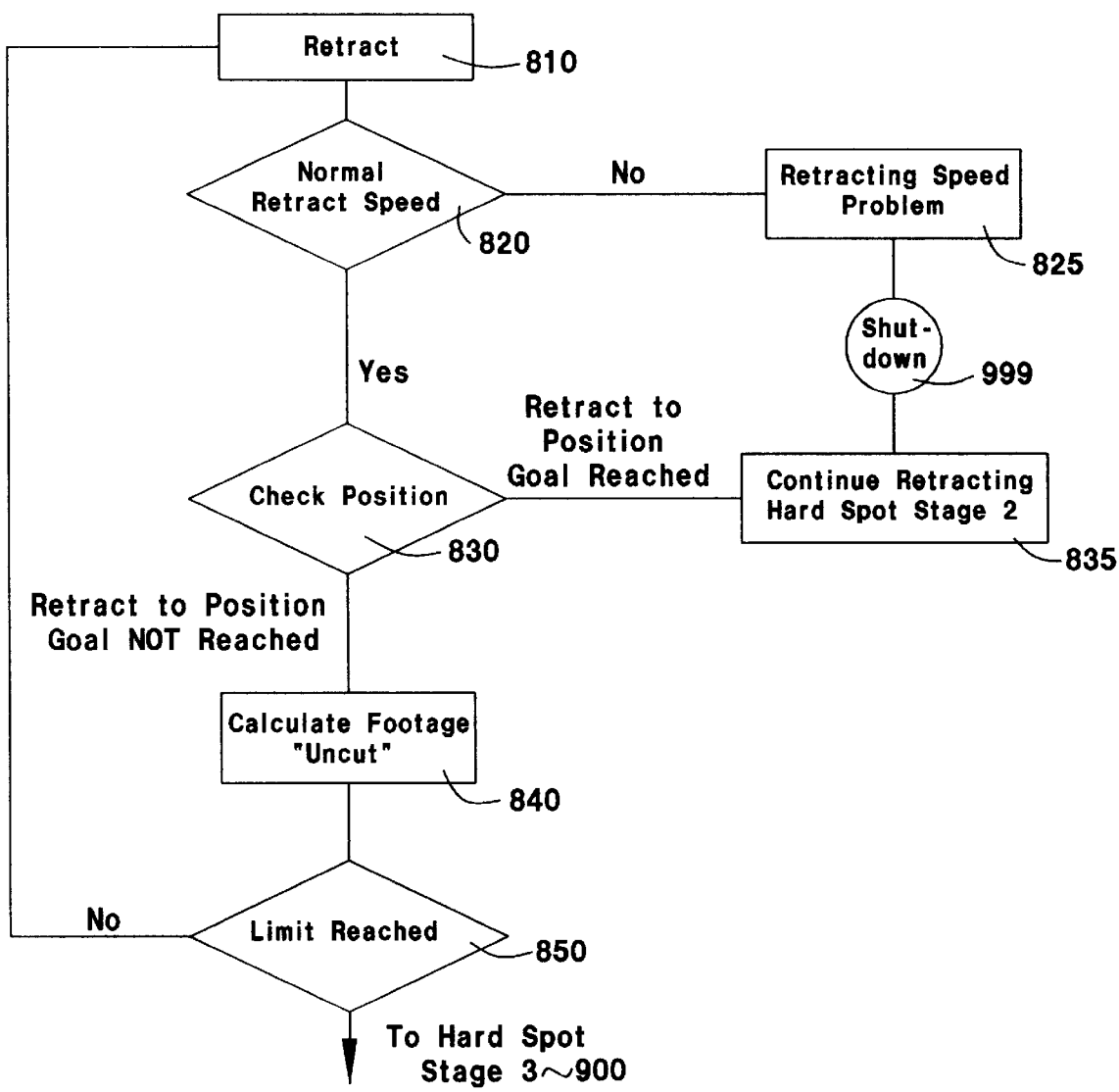
Figure 9:
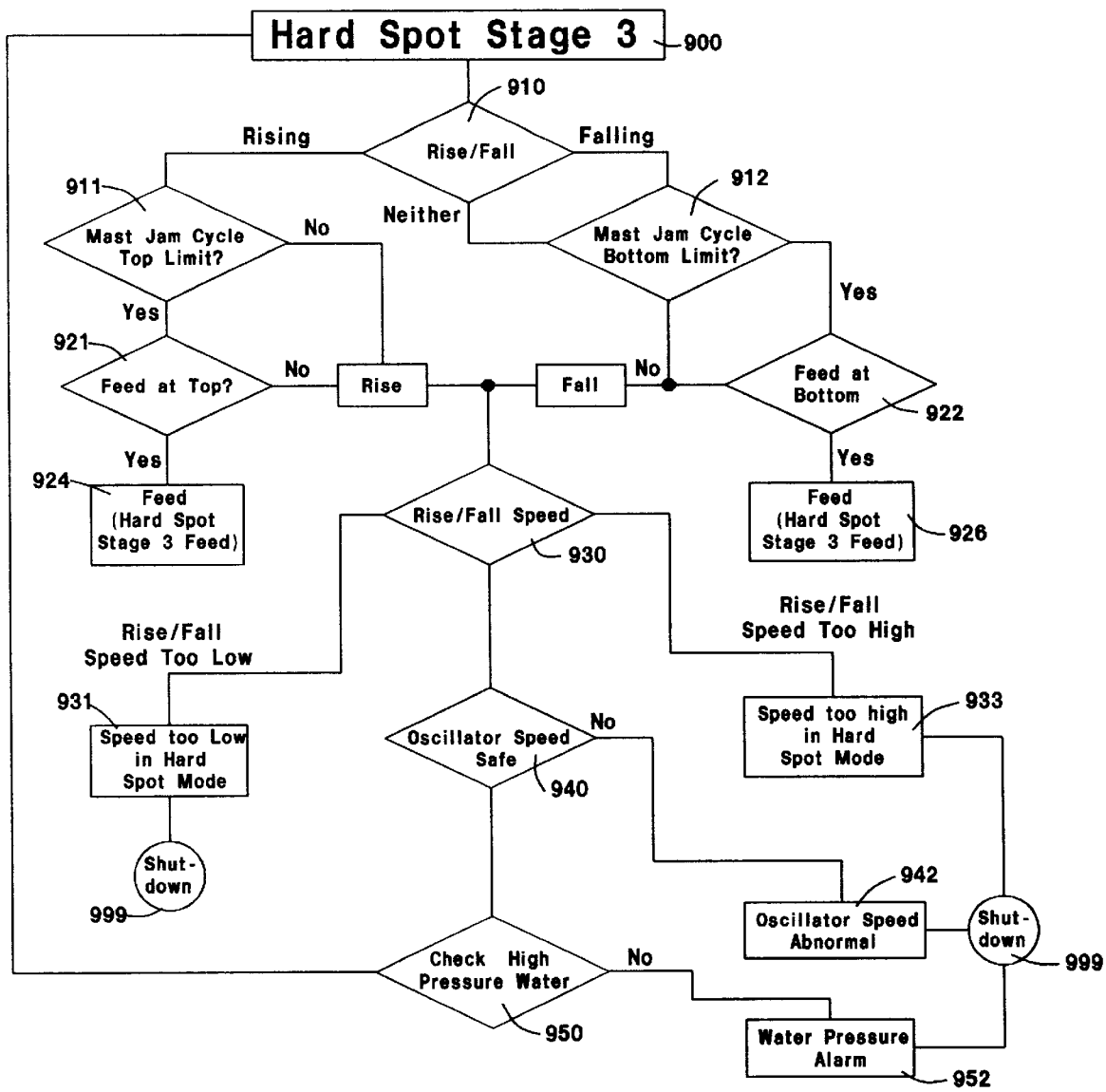
Figure 10:
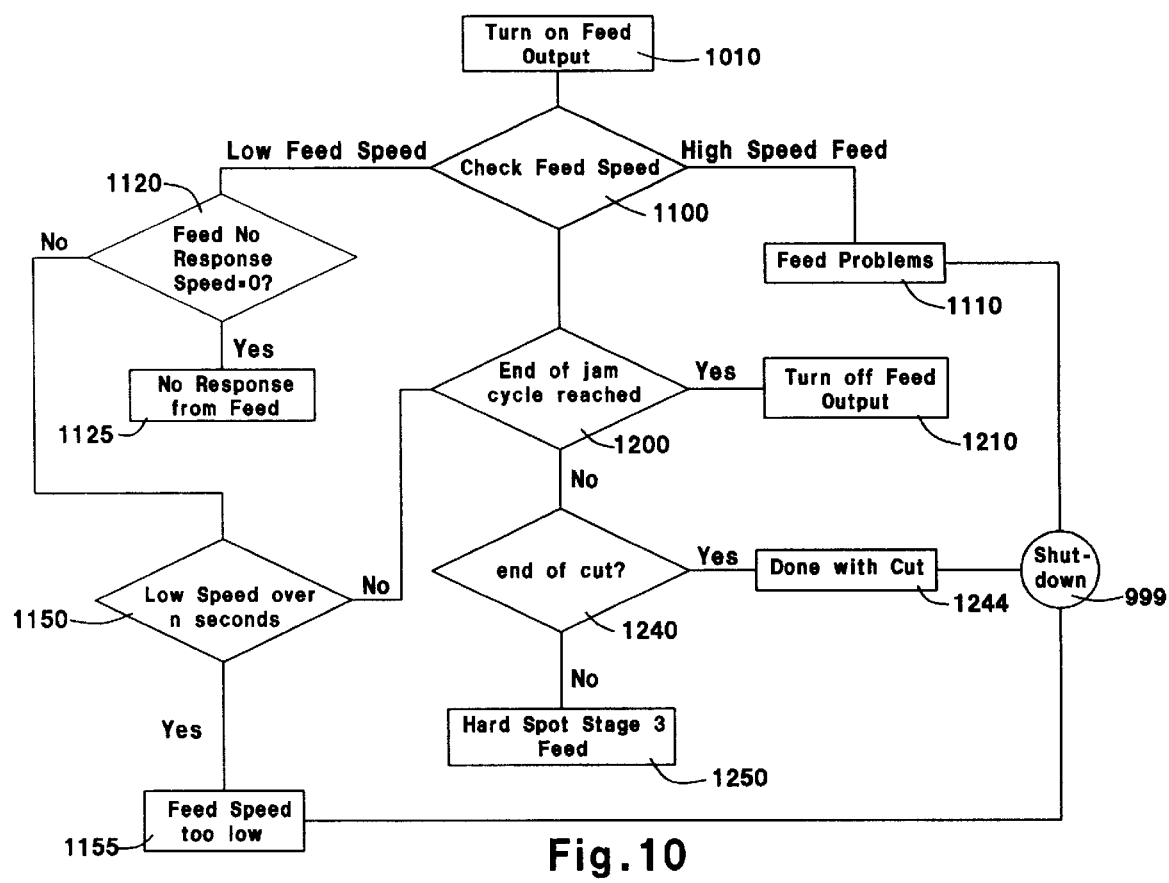
Figure 11:
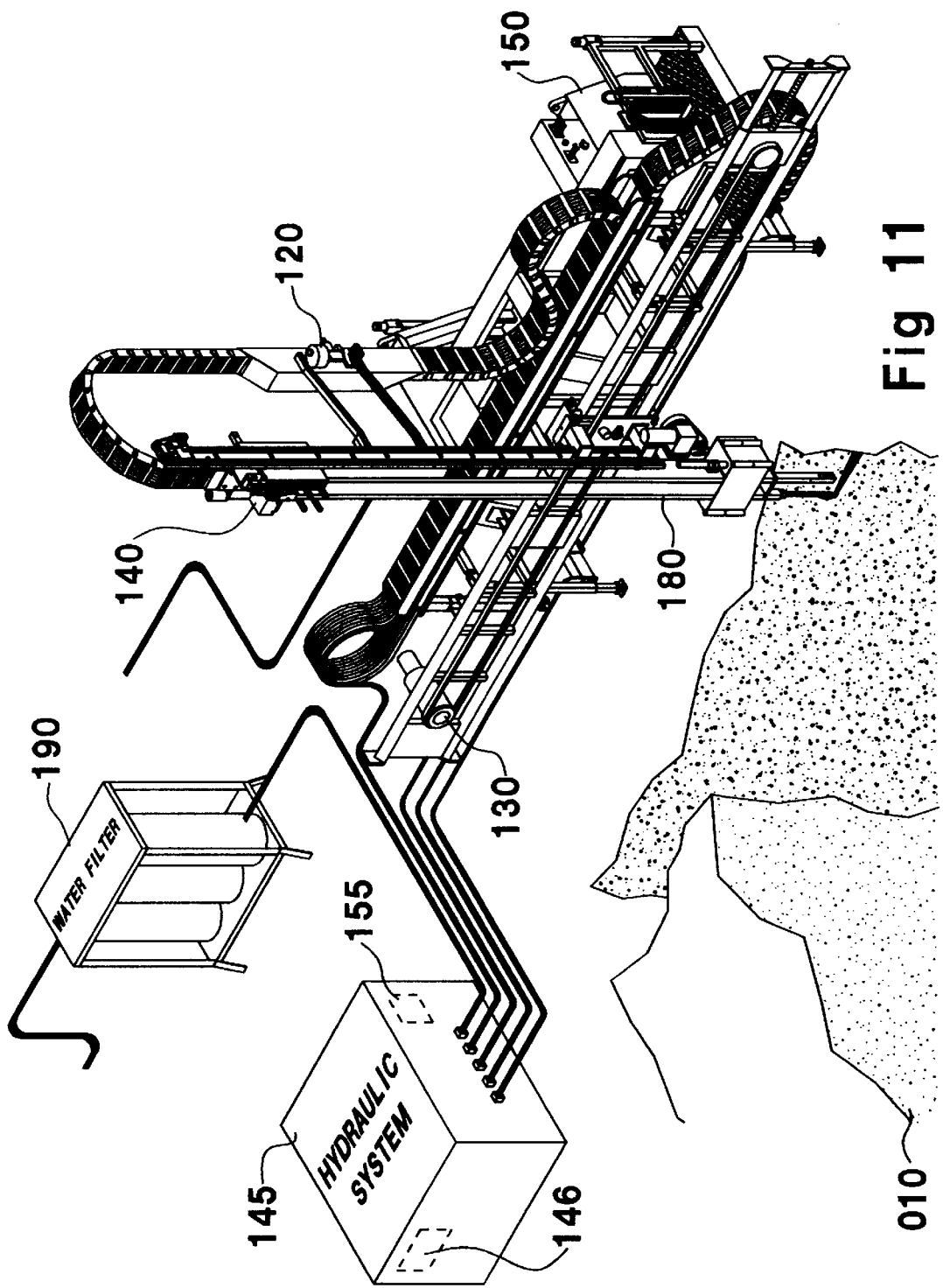

h) FIG. 6 flow-chart depicts the hard spot stage 0 algorithm.

i) FIG. 7 flow-chart depicts the hard spot stage 1 algorithm.

j) FIG. 8 flow-chart depicts the hard spot stage 2 algorithm.

k) FIG. 9 flow-chart depicts the hard spot stage 3 algorithm.

l) FIG. 10 shows the protocol for the feed/jam cycle of the hard spot stage 3 algorithm.

m) FIG. 11 shows a 3 D perspective view of Automatic Quarry Operation System with Communication Interface.

DETAILED DESCRIPTION OF THE PREFERRED EMBODIMENT

Figure 1B:
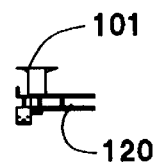
FIG. 1(b) 2 is a top elevation thereof.
Figure 1A:
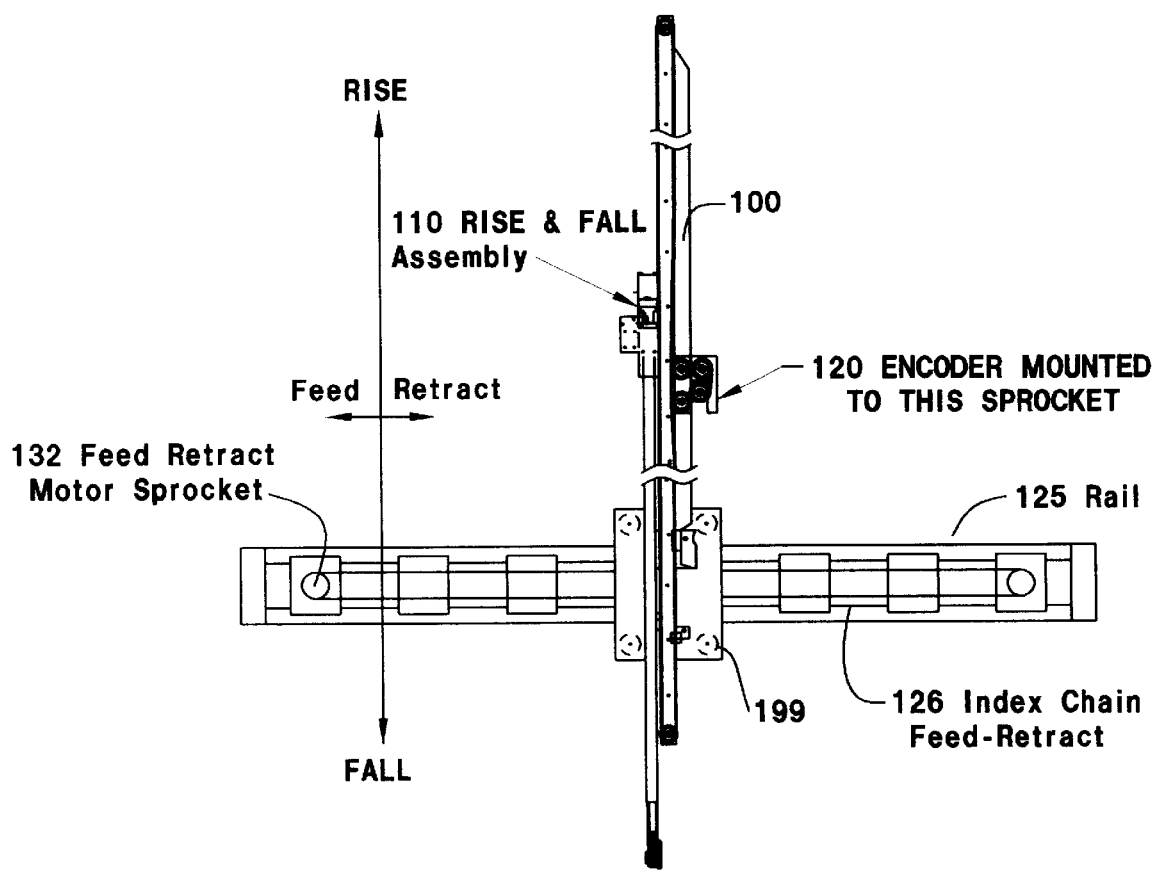
FIG. 1(a) is a front elevation of the quarry robotic arm of this invention.
Figure 1C:
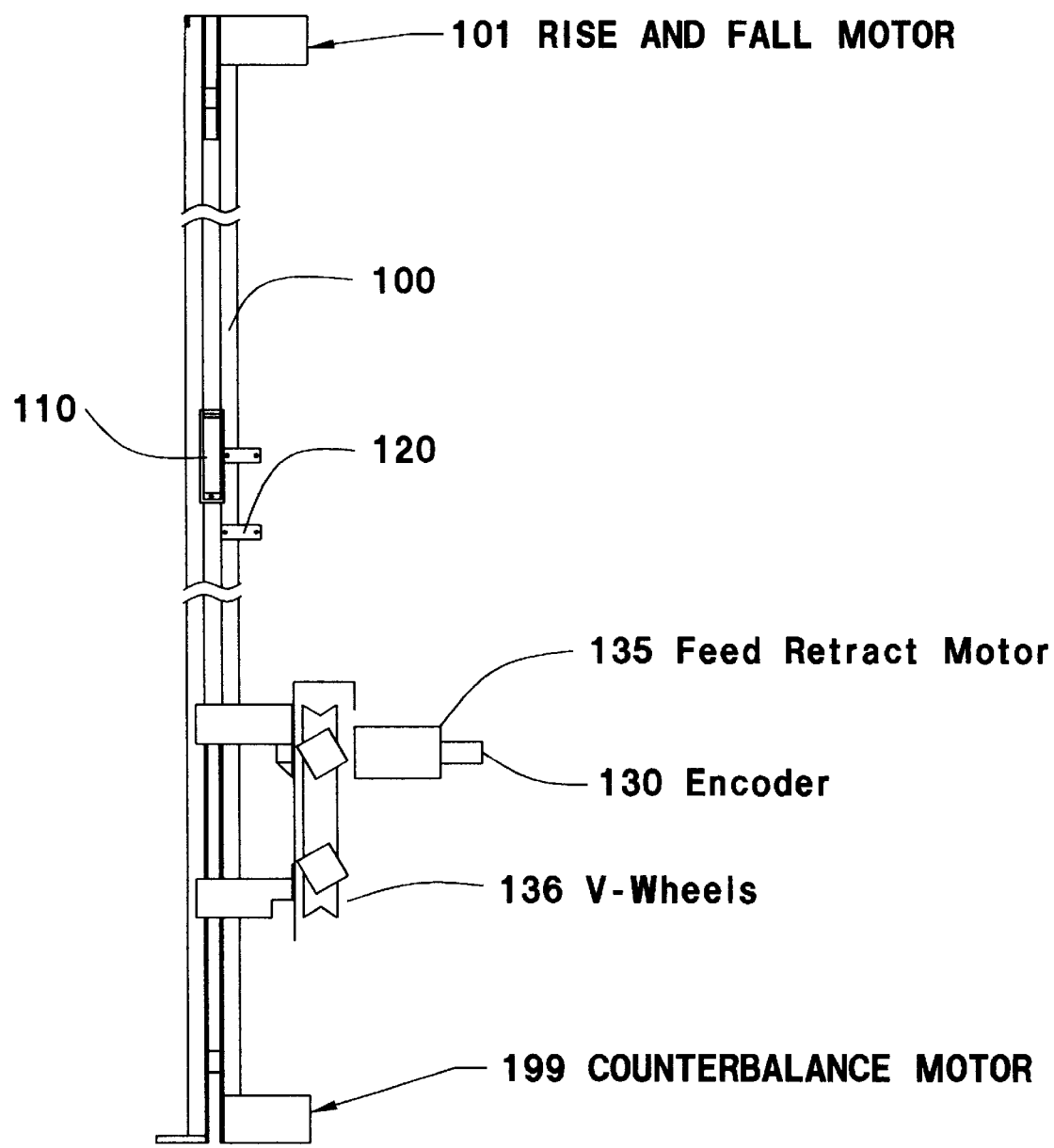
FIG. 1(c) is a side elevation thereof.

As shown in the drawings wherein like numerals represent like parts throughout the several views, there is generally disclosed in FIG. 1 a robotic member 100 with rise and fall assembly 110 including feed and retract means. FIGS. 1 (a,b,c) are front top and side elevations thereof respectively. At the top of the robotic mast vertical member 100 is mounted the rise and fall motor 101 and at the bottom of the robotic mast vertical member 100 is mounted a counter balance motor 199 to balance the motor 101 at the top.

The computer controlled robotic member 100 has an arm 110 with rise and fall and feed and retract control also includes a PLC (programmable logic controller) a boom leveling system for tilt, dump and swing, tilting system for chain feed to level and position in travel mode and E Chain containing extendible, flexible high pressure hose as well as means for disengaging the oscillator from the high pressure tubing without breaking any fittings for centering purposes.

Figure 2:
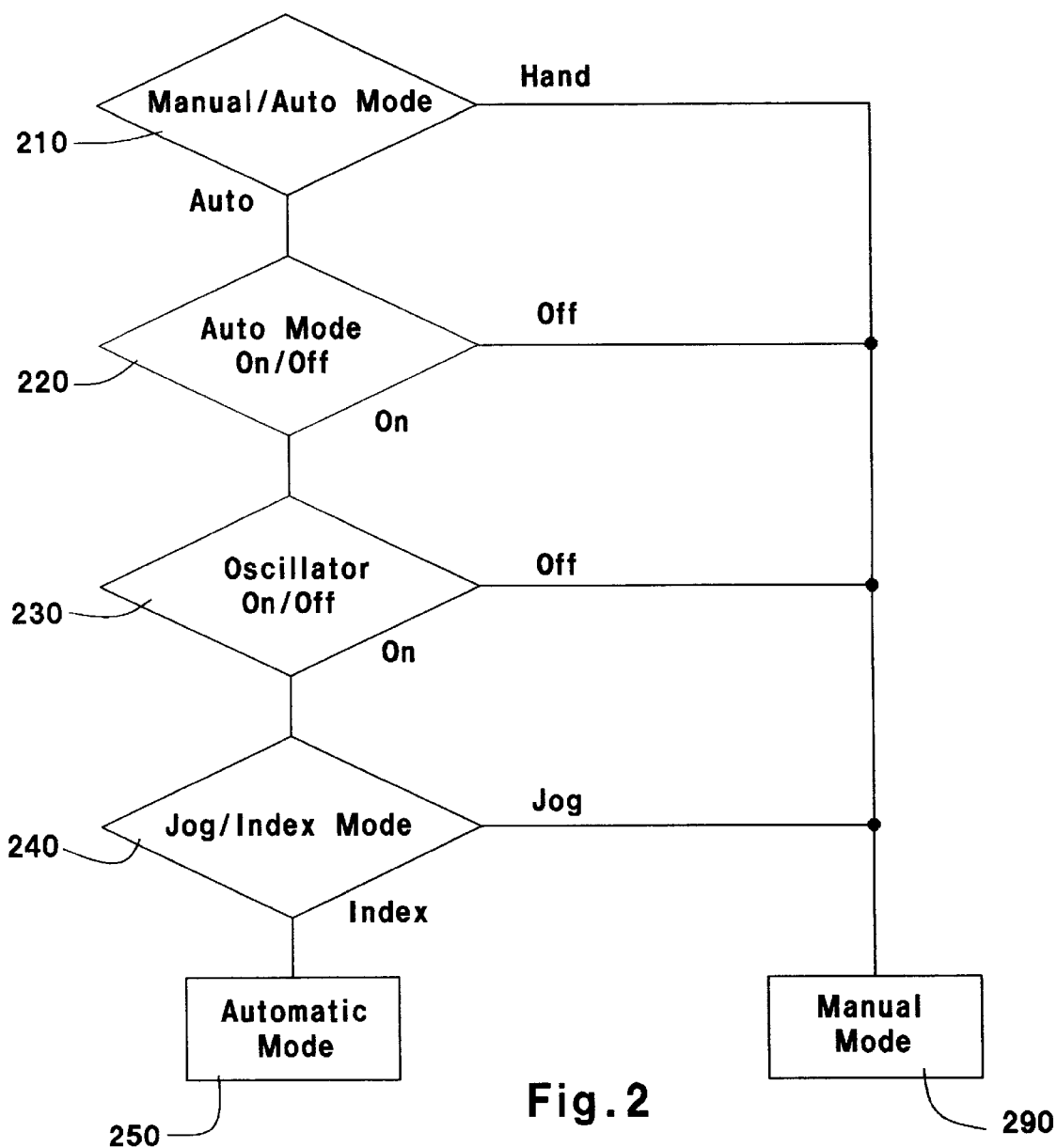

FIG. 2 is a computer program flow chart of the overall operation of the unattended quarry operation with communication interface of this invention delineating both the manual mode and the automatic mode operations.

Figure 3:
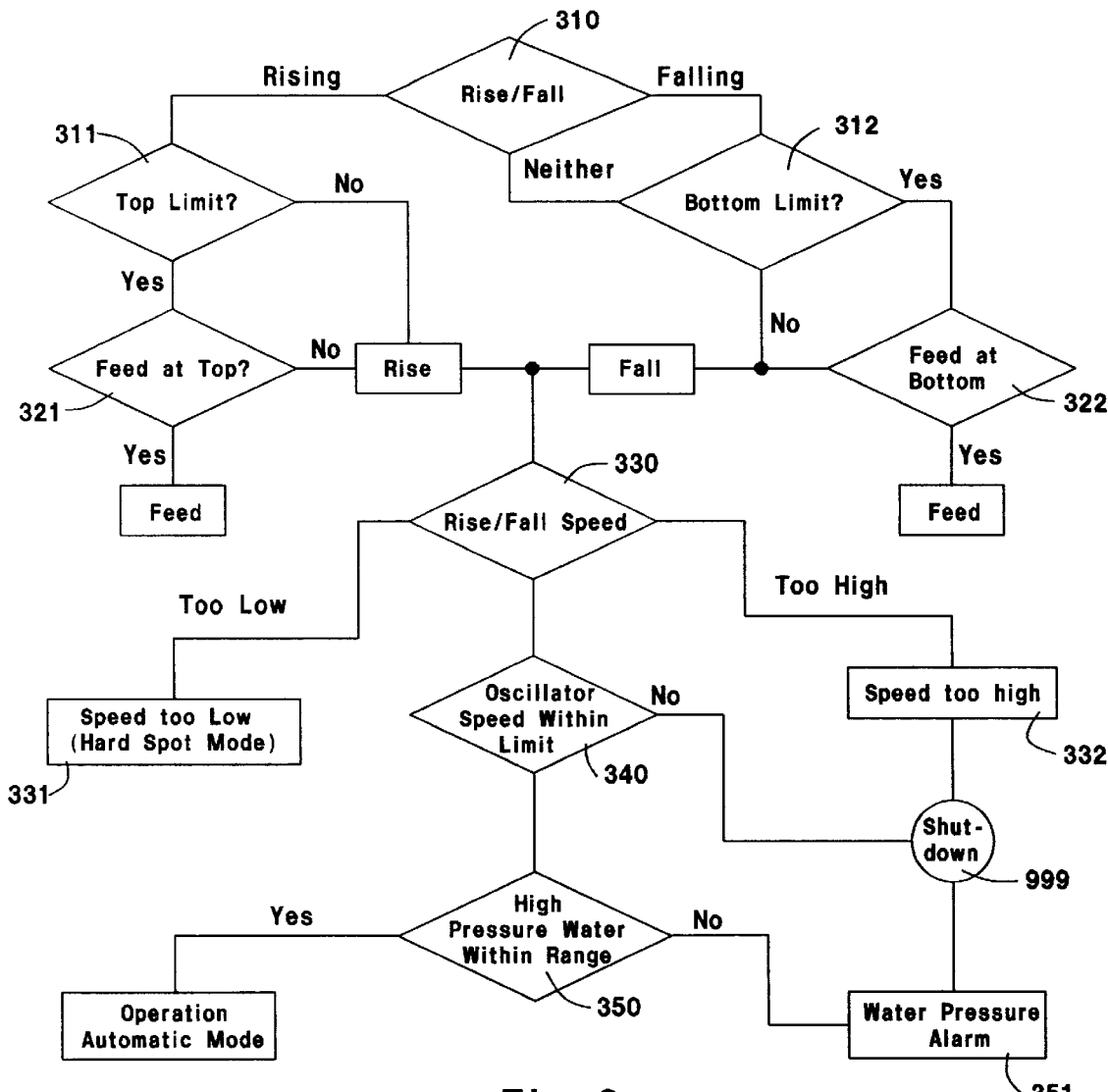
FIG. 3 is a flow chart of the automated quarry operation in the manual mode.

FIG. 3 shows the logic of the manual mode operation wherein the decision blocks are diamond shape and operational blocks are rectangular and shut down sequence circular.

Figure 4:
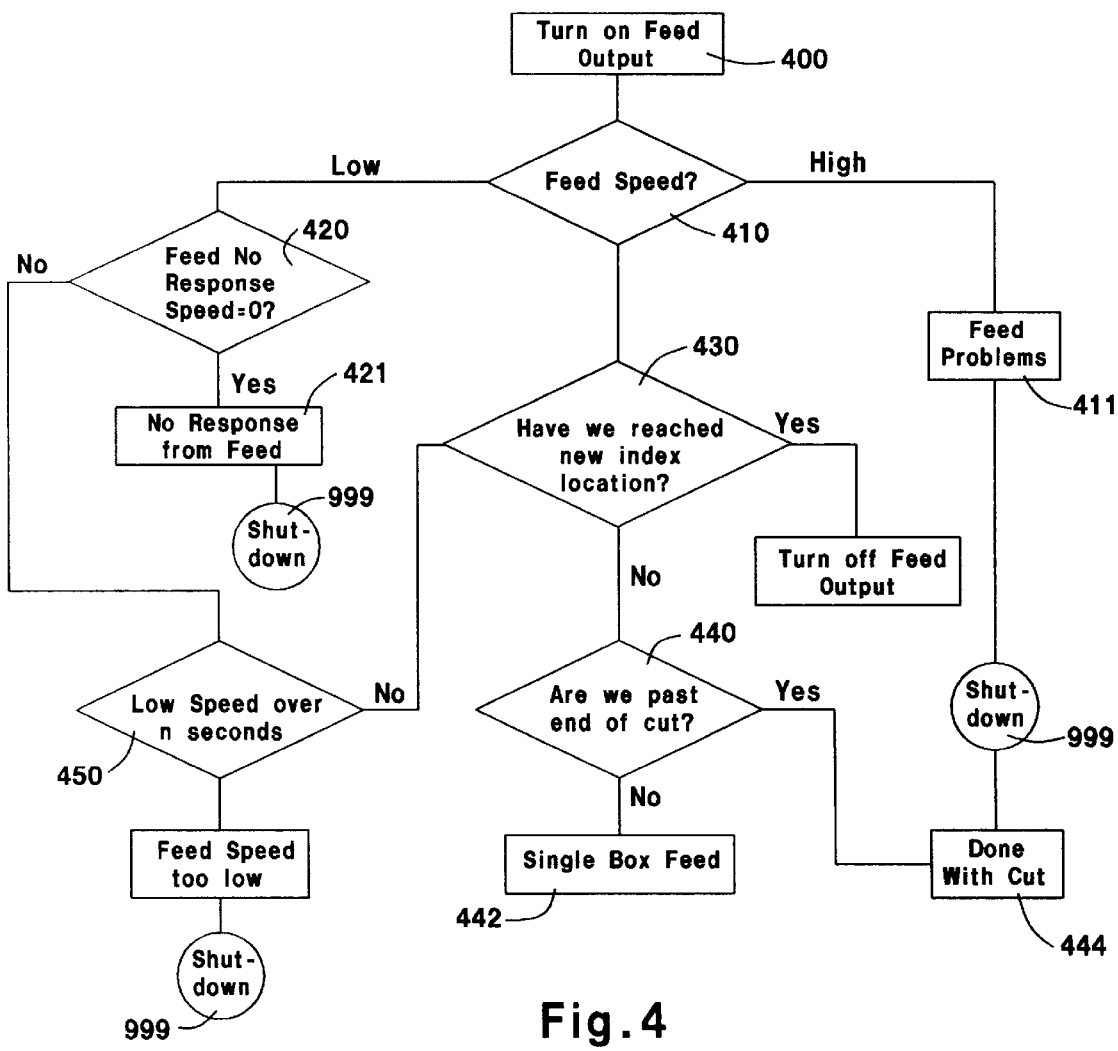
FIG. 4 is a flow chart of the feed flow algorithm of the automated quarry operation of this invention.

FIG. 4 shows the feed flow chart wherein the decision blocks are diamond shape and operational blocks are rectangular and shut down sequence circular.

Figure 5:
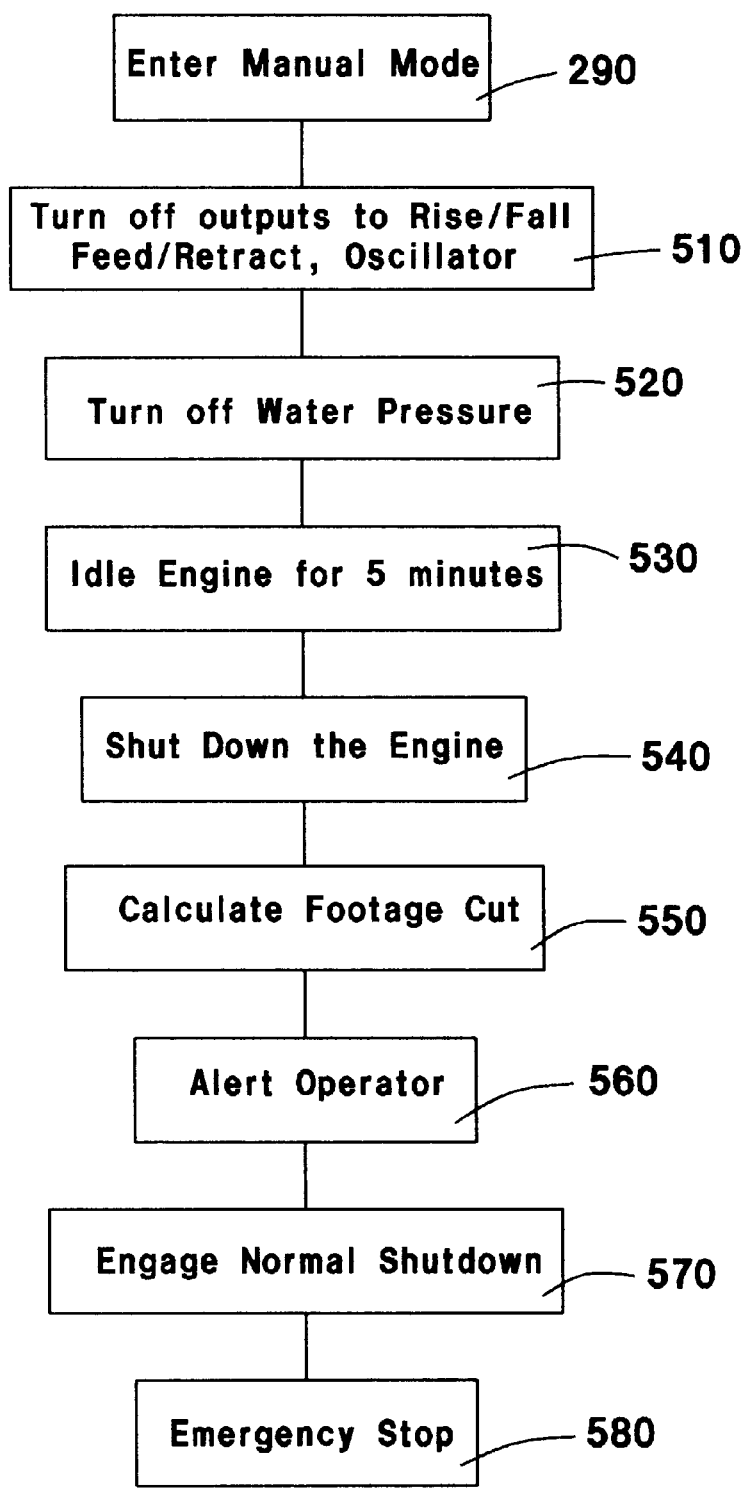
FIG. 5 shows the flow-chart for the automatic shutdown when the quarry robot encounters unworkable difficulties.

FIG. 5 shows the shutdown sequence in the manual mode. FIG. 6 shows the flow-chart for the pre hard spot stage 0 (600) wherein the decision blocks are diamond shape and operational blocks are rectangular and shut down sequence circular.

FIGS. 7 through 9 show the logic of the computer program for the automatic mode for hard spot stages one (700). two (800) and three (900) respectively in the flow-chart format, wherein the decision blocks are diamond shape and operational blocks are rectangular and shut down sequence circular.

FIG. 10 shows the logic of the feed/jam cycle of the hard spot stage 3 in the automatic mode in flow-chart format wherein the decision blocks are diamond shape and operational blocks are rectangular and shut down sequence circular.

The following sensors and transducers are also integral part of the system.

a) Rise & Fall Encoder 120 such as Dynapar series H20 records position and speed along the rise & fall axis. Top limit, bottom limit, home for manned & unmanned mode, hard spot top, and hard spot bottom are stored based on material and cut considerations.

b) Feed & Retract Encoder 130 such as Dynapar series H20 records position on horizontal axis. Manned & unmanned mode index value, end cut position, hard spot index value, and hard spot retract value are stored based on material and cut considerations.

c) Balanced Oscillator Speed Sensor 140 such as a magnetoresistive sensor by Rechner records speed in rpm's of the balanced oscillator. Max and Min speed limits are stored and if either are reached an output will initiate a shut down.

d) High Pressure Water Sensor 160 such as sensotec model TJE records pressures up to 50,000 psi. Max and Min pressures are stored and if either are reached an output will initiate a shut down. The high pressure water sensor 160 also acts as an alarm to shut the system down in the proper manner. A high and low pressure alarms is set by the operator in the manual mode but in the automatic mode it is pre-programmed.

These alarms reduce the risk of equipment damage in unmanned operation.

e) The main output sensor is the communication interface 150 such as a cellular phone or a pager. In the preferred embodiment the inventors used Zetron Model 1516 from Milbank Communications of South Dakota. The communication interface 150 upon meeting a predefined criteria automatically dials the remote location. The cellular phone communication interface allows the operator to spend less time on the quarry site which not only reduces the employee exposure to the hazards of the occupation but also reduces the operating cost of cutting slots in quarries. In the automatic mode after a shut down the cell phone calls the various beeper numbers to notify reason for shut down.

In addition there are proximity sensors (not shown) to obviate accidental bumping or travel beyond safe limits of the robot arm.

OPERATION

The balanced oscillator assembly 110 moves up and down (also known as rise and fall) under the control of a PLC (Programmable Logic Controller) 175.

The balanced oscillator speed is function of many variables including the rise and fall, the grain of the stone being cut. In the preferred embodiment the oscillator speed was 1200 cycles per minute.

The rise and fall motor 101 IS assisted and counter balanced by motor 199 to reduce the strength of the system in the downward direction in order to protect the nozzle 185 and the high pressure fittings. The wand 180 is mounted on the rise and fall assembly which is also capable of moving in and out, towards and away from the cut respectively. The high pressure water jet sapphire nozzle 185 is mounted on this wand 180. The distance of the travel is determined by positioning of the top and bottom proximity sensors (not shown). This motion is repeated over and over again unless in the unlikely event the oscillator or some other related component jams, in which case the automatic shut down procedure takes over if in automatic mode or if in manual mode the operator initiates the shut down 999 sequence.

The horizontal travel (also known as indexer) moves a programmable predetermined amount which is normally activated when the bottom proximity sensor is activated. It is also possible to index at top only or top and bottom both.

Feed & Retract is the horizontal axis. The Feed Retract encoder is fixed to the Feed Retract motor shaft, if the Feed Retract motor is actuated the Feed Retract motor turns and moves the chain which moves the wand forward into the cut or backward away from the cut. The Feed Retract encoder relays position information to the PLC. This axis is actuated in automatic mode when either top ,bottom or both are on and when index on the jog/index switch is actuated.

Even in the manual mode if an obstruction causes the oscillator or the rise and fall to slow down or stop, the computer 95 senses a change of speed and shuts down automatically. This is a very effective safety feature for the unexpected in the quarries.

AUTOMATIC MODE

When actuated in automatic mode the wand moves into the cut by the index amount stored in the computer monitor. This index value is entered by the operator based on the stone characteristics. The operator may choose to index either at the top of the cut or the bottom of the cut or both top or bottom.

The "hard spot" cycle initiates repeated cutting in the hard area without wasting time over the complete cut. The hard spot stage 0 (600) merely ascertains whether or not any hard spot is involved before making a logic decision to enter manual or automatic mode.

To understand the operation of the stage 1 (700) of hard spot cycle, assume the wand 180 is jammed while falling. The wand 180 would rise until the top "hardspot position" is reached (usually 12" unless top limit is reached first).

At this point the system enters into hard spot stage 2 (800) of hard spot cycle. The PLC 175 will send one signal to the feed/retract motor until the hard spot retract (2" usually) value is reached.

Once this position is reached the system enters the hard spot stage 3 (900). At stage 3 the wand 110 begins falling, the wand passes by the actual point of jamming and travel to the bottom until the "hardspot position" is reached (usually 12" unless bottom limit is reached first).

Hard spot stage three (900) is actually a mini automatic cycle without a hard spot cycle within it. When approaching the bottom limit the wand indexes into the cut as it does in automatic cycle except the index value corresponds to the "hard spot" index value.

This "hard spot" index value is entered by the operator based on the stone characteristics. The wand 180 will continue to Rise, index at top "hard spot position" and fall and continue until the current index position is one index less than the index value when hard spot cycle was started. At that point the PLC 175 jumps back into Automatic cycle referencing the auto cycle's top bottom and index values.

The benefits of the system are better efficiency using the plc to work out of hard spots rather than by manual operation. Unmanned operation also reduces the operating cost of equipment, which in turn leads to better productivity and cost. Furthermore in the automatic mode there is less exposure to occupational hazards for the employee which reduces accidents, noise, dust from blasting. All of this leads to lower, reduced or negligible liability.

To use this system the inventors recommend the following steps:

a) Initialize the system
b) Position the system at proper coordinates.
c) Program the coordinates of the location of the system
d) Program the coordinates of the object to be cut.
e) Define and enter the thickness of the cut
f) Define and enter the pitch (the distance between the zig zags). It should be noted that the optimum pitch is defined by the stone structure and its strength in tension. As a rule of thumb the larger the grain structure the higher the pitch.
g) Enter the desired balanced oscillator speed if not already preprogrammed.
h) Program the nozzle jet cutting tool path or load in the program from a preprogrammed computer readable media.
i) Program automatic shut off cycle.
j) Enter phone number of the remote supervisor in the communication interface for remote automatic message after shutdown.
k) Push auto cycle start and oscillator on when ready.
l) If in manual mode monitor the control panel for any problems.
m) If in automatic mode the operator may leave site.
n) Travel back to site upon intimation from the system that it has shut down or notification of other problem that need operator attention.
o) Repeat steps a through n for the next cut or next program as necessary.

The inventor has given a non-limiting description of the concept. Many changes may be made to this design without deviating from the spirit of the concept of this invention. Examples of such contemplated variations include the following.

a) a different combination of input sensor and output transducers may be used.
b) The hard spot algorithm may be modified.
c) The communication interfaced may be varied.
d) A different means may be used to initiate the hard spot cycle for example in hydraulic drive systems one could also measure hydraulic pressure and as resistance increases hydraulic pressure would rise. From the pressure change one could use the plc to initiate "hard spot" or use hydraulic valving to start a hard spot sequence.

Similarly in electric drive systems one could also measure current draw which could signal the plc to initiate hard spot.

e) Instead of the hard spot cycle taught here one could develop a sensor or some sort of limit switch, or Video camera system that could record the cut profile, which could be used to effectively predict the obstruction and hence the initiation of the hard spot cycle.

f) The crawler may be obviated or substituted by a mobile unit.

g) The PLC may be replaced by a general purpose personal computer.

h) The cutting methodology and embodiment may be adapted for other related applications such as in mining or for cutting other materials.

i) A different permutation and combination of the parts disclosed here may be used to fine tune the cut.

j) Additional features such as a automatic display, automatic safety features may be incorporated.

k) The programming may be further simplified such that it is user programmable.

Other changes such as aesthetic and substitution of newer materials as they become available which substantially perform the same function in substantially the same manner with substantially the same result without deviating from the spirit of this invention.

Following is a listing of the components used in this embodiment arranged in ascending order of the reference numerals for ready reference of the reader.

010—Quarry stone
100—Quarry Robot drilling member generally
101—Rise and Fall Motor
110—Rise and Fall Assembly
120—Rise/Fall Encoder
125—Rail
126—Feed Retract Index Chain
130—Feed and Retract Encoder
132—Feed Retract Motor Socket
135—Feed Retract Motor
136—V Wheels
140—Balanced Oscillator Speed sensor
145—Hydraulic System
146—Triplex Plunger Pump Hydraulic Intensifier
150—Communication interface for phone
160—High pressure water sensor
170—Balanced Oscillator
180—Wand
199—Counter Balance Motor
210—Decision Logic to ascertain Manual Auto Mode
220—Decision Logic to ascertain Auto Mode On Off
230—Decision Logic to ascertain Oscillator On Off
240—Decision Logic to ascertain Jog Index Mode
250—Automatic mode operation
290—Manual mode operation
310—Decision Logic to ascertain Rise/fall i manual mode
311—Decision logic to ascertain if top limit has been reached in manual mode.
312—Decision Logic to ascertain if bottom limit has been reached in manual mode
321—Decision Logic to ascertain feed at top in manual mode
322—Decision Logic to ascertain feed at bottom in manual mode
330—Decision Logic to ascertain Rise Fall Speed
331—Speed Too Low to enter Hard Spot Mode operation
332—Speed Too High to prepare for immediate but safe shutdown
340—Decision Logic to ascertain if oscillator speed is within safe range
350—Decision Logic to ascertain if high water pressure is within safe range
351—Water Pressure Alarm
400—Feed Output On operation
410—Decision Logic to ascertain feed speed
411—Feed Problems
420—Decision Logic to ascertain feed response
421—No response from Feed. Prepare for shutdown
430—Decision Logic to ascertain if new index location has been reached.
432—Turn off feed output operation
440—Decision Logic to ascertain if "End of Cut" is reached
442—Single box feed operation
444—Cut complete
450—Decision logic to ascertain if low speed for a predetermined length of time
510—Turn off outputs to Rise/Fall, Feed Retract and balanced oscillator
520—Turn off water pressure
530—Idle engine for 5 minutes
540—Shut down the engine
550—Computer footage cut
560—Alert operator
570—Engage normal shut down
580—Emergency Stop
600—Automatic Mode Hard Spot Stage 0
610—Decision logic to ascertain if system is in hard spot mode
612—Operation in single hard spot mode
620—Decision logic to ascertain if nth hard spot of the session has been reached.
622—Too many hard spots—Prepare for shut down
650—Store location data
660—Decision logic to ascertain Rise Fall in automatic mode in hard spot stage 0 (1st hard spot stage)
662—Robot Arm Falling
664—Robot Arm Rising
700—Automatic Mode Hard Spot Mode Stage 1
710—Decision logic to ascertain Rise Fall in automatic mode in hard spot stage 1 (2nd hard spot stage)
711—Decision logic to ascertain if robot arm jam has occurred or top limit has been reached in automatic mode hard spot stage one.
712—Decision Logic to ascertain if robot arm jam is jammed or bottom limit has been reached in automatic mode hard spot stage 1
730—Decision logic to ascertain if Rise Fall speed is within safe range in automatic mode hard spot stage 1

732—Speed unacceptable—Enter automatic shutdown sequence
740—Decision logic to ascertain if balanced oscillator speed is within safe range in automatic mode hard spot stage 1
742—Speed unacceptable—Enter automatic shut down sequence
750—Decision Logic to ascertain if high water pressure is within safe range in automatic mode hard spot stage 1
752—Water Pressure Problem—Enter automatic shut down sequence
800—Automatic Mode Hard Sport Stage 2
810—Retract operation
820—Decision Logic to ascertain if retract speed is normal within safe range
825—Retract speed problem—Enter automatic shut down sequence
830—Decision logic to ascertain retract position and whether or not the goal is reached.
835—Continued retraction till goal is reached and shut down sequence initiated
840—Compute uncut length footage
850—Decision logic to ascertain if limit is reached
900—Automatic Mode Hard Spot Stage 3
910—Decision logic to ascertain Rise & Fall in automatic mode in hard spot stage 3
911—Decision logic to ascertain if robot arm has jammed or top limit has been reached in automatic mode hard spot stage three.
912—Decision Logic to ascertain if robot arm has jammed or bottom limit has been reached in automatic mode hard spot stage 1
921—Decision Logic to ascertain feed at top in automatic mode hard spot stage 3
922—Decision Logic to ascertain feed at bottom in automatic mode stage 3
930—Decision logic to ascertain if Rise Fall speed is within safe range in automatic mode hard spot stage 3
931—Rise & Fail Speed Too Low—Enter automatic shutdown sequence
933—Rise Fail Speed Too High—Enter automatic shutdown sequence
940—Decision logic to ascertain if balanced oscillator speed is within safe range in automatic mode hard spot stage 3
942—Balanced Oscillator Speed unacceptable—Enter automatic shutdown sequence
950—Decision logic to ascertain if balanced oscillator speed is within safe range in automatic mode hard spot stage 3
952—Speed unacceptable—Enter automatic shut down sequence
999—Manual or automatic Shutdown
1000—Automatic ode Hard Spot Stage 3 Feed Jam Cycle
1100—Decision logic to ascertain if feed speed within safe range
1110—Feed Problems—Enter automatic shutdown sequence
1120—Decision logic to ascertain feed response
1125—No response from feed—Enter automatic shut down sequence
1150—Decision logic to ascertain if feed speed low for a predetermined period of time
1155—Feed Speed Too Low for a predetermined period of time—Enter automatic shut down sequence
1200—Decision logic to ascertain if "End of Jam" cycle is reached
1210—End of Jam cycle reached—Turn off feed output automatically
1240—Decision logic to ascertain if "End of Cut" reached
1244—End of cut reached—Enter automatic shut down sequence
1250 Hard Spot Stage 3 automatic feed operation.

DEFINITIONS

While exacting care has been taken to avoid terms of art and use words with their conventional dictionary meaning the following definitions are included for clarification of the specification and its interpretation.

CPU—Central processing unit of a computer capable of performing all the timing, control, logic associated with running a computer program.

Hard Spot Stage—A particular hard spot in a quarry which is solved or circumvented by a particular algorithm.

Interface—Matching or two or more dissimilar entities however realized

Program—A computer program executable in a given computing environment.

PLC—Programmable Logic Controller

While this invention has been described with reference to illustrative embodiments, this description is not intended to be construed in a limiting sense. Various modifications and combinations of the illustrative embodiments as well as other embodiments of the invention will be apparent to person skilled in the art upon reference to this description. It is therefore contemplated that the appended claims cover any such modifications, embodiments as fall within the true scope of the invention.

What is claimed is:

1. An automated programmable quarry robotic system comprising:

a) a quarry robot with an arm (capable of) having 3 axis movement wherein said arm guides a high pressure water jet;

b) plurality of input sensors strategically located on said quarry robot;

c) a communication interface connected to said quarry robot;

d) a PLC programmed to initiate a shut down sequence of said robotic system in case of any outputs of said plurality of input sensors exceed certain preprogrammed limits; and e) means for communicating status of said robotic system automatically if and when said shut down sequence is initiated.

2. A programmable automated oscillating liquid jet cutting robotic system particularly adopted for cutting granite on-site at quarries comprising:

a) an automated unit with 3 axis movement including risefall, feed retract and to and fro sideways movement;

b) a power unit mounted on said automated unit;

c) at least one hydraulic intensifier unit, mounted on said automated unit and connected to and powered by said power unit;

d) a nozzle having a diamond orifice connected to said hydraulic intensifier unit;

e) an extendible, flexible, high pressure hose connected between said intensifier unit and said nozzle;

f) plurality of input and output sensors and transducers;

g) a balanced oscillator for moving said nozzle in oscillatory manner;

h) a rise/fall sensor, a feed retract sensor, a balanced oscillator speed sensor and a high water pressure sensor strategically located on said robotic system;

i) a programmable logic controller mounted on said automated unit and operatively connected to said nozzle for guiding the path and movement of said nozzle via said means for moving said nozzle in oscillatory manner;

j) a communication interface connected to said quarry robot;

k) said PLC programmed to initiate a shut down sequence of said robotic system in case of outputs of said risefall, sensor, said feed/retract sensor, said to and fro sideways speed sensor and said high pressure water sensor exceed certain preprogrammed limits; and l) means for communicating status of said robotic system automatically if and when said shut down sequence is initiated.

3. A method of cutting stones on-site at a quarry comprising:

a) intensifying a liquid jet;

b) exiting said intensified liquid via a nozzle;

c) oscillating the nozzle by an electro-mechanical balanced oscillator with equal dwell time at each end of the oscillation;

d) programming the jet path, pitch and thickness of cut via a computer;

e) providing a communication interface;

f) sensing and determining if risefall speed, feed retract speed, oscillator speed and high water pressure are within safe range;

g) initiating an automatic shut down sequence in case said rise/fall speed, said feed/retract speed, said oscillator speed and said high water pressure are outside said safe range; and h) communicating the status of said system to an operator via said communication interface.

* * * * *